(12) United States Patent
Feng

(10) Patent No.: US 6,989,429 B2
(45) Date of Patent: Jan. 24, 2006

(54) PREPOLYMER COMPOSITIONS AND SEALANTS MADE THEREFROM

(75) Inventor: Ta-Min Feng, Hudson, OH (US)

(73) Assignee: Tremco Incorporated, Beachwood, OH (US)

( * ) Notice: Subject to any disclaimer, the term of this patent is extended or adjusted under 35 U.S.C. 154(b) by 85 days.

(21) Appl. No.: 10/677,789

(22) Filed: Oct. 2, 2003

(65) Prior Publication Data

US 2005/0075469 A1    Apr. 7, 2005

(51) Int. Cl.
*C08G 18/80*    (2006.01)
(52) U.S. Cl. .......................... 528/28; 528/45; 524/323; 524/736
(58) Field of Classification Search .................. 528/28, 528/45; 524/323, 736
See application file for complete search history.

(56) References Cited

U.S. PATENT DOCUMENTS

| 4,507,443 | A |   | 3/1985  | Barron et al. |         |
|-----------|---|---|---------|---------------|---------|
| 4,857,623 | A |   | 8/1989  | Emmerling et al. |      |
| 6,162,938 | A | * | 12/2000 | Hansen et al. | 556/419 |
| 6,498,210 | B1|   | 12/2002 | Wang et al.   |         |

FOREIGN PATENT DOCUMENTS

| EP | 0 343 523 A2 | 11/1989 |
| EP | 0 350 890 A2 | 1/1990  |
| EP | 0 676 403 A1 | 10/1995 |

* cited by examiner

*Primary Examiner*—Rachel Gorr
(74) *Attorney, Agent, or Firm*—Calfee, Halter & Griswold LLP

(57) ABSTRACT

Prepolymer compositions for preparing a one-part, moisture-curable sealant, adhesive or coating, and a method of making such prepolymer compositions are provided. The prepolymer compositions comprise a polyurethane prepolymer that is end-capped with silane groups or a combination of silane groups and end capping groups that have been derived from an alcohol and an amount, referred to hereinafter as an "excess", of unreacted aromatic alcohol having a molecular weight of less than 2000. The excess of unreacted aromatic alcohol in the composition is from greater than 0% to 15% by mole of the level of original NCO groups in the prepolymer. From 50 to 100% of the original NCO groups are end-capped with silane groups, and from 0 to 50% of the original NCO groups are end-capped with a end-capping group that has been derived from an aromatic alcohol, an aliphatic alcohol or both. Sealant compositions and coating compositions comprising the present prepolymer composition are also provided.

34 Claims, No Drawings

PREPOLYMER COMPOSITIONS AND SEALANTS MADE THEREFROM

BACKGROUND

Sealants are used to provide liquid and gaseous barriers in various applications. Such applications include bonding of dissimilar materials, sealing of expansion joints, assembling curtain walls and side walls, weatherproofing, constructing roofing systems, and sealing the perimeters around doors, windows and other building components (i.e., perimeter sealing).

Sealant compositions can be of the one-part or two-part variety. Moisture curable, one-part sealant compositions generally contain end-capped polyurethane prepolymers and, usually, a curing catalyst that promotes a cross-linking reaction between the prepolymers when the sealant composition is exposed to atmospheric moisture. Upon application under normal conditions of temperature and moisture, one-part sealant compositions react to form tough, pliable elastomeric seals.

Sealant and coating compositions desirably have a combination of properties which render them particularly suitable for their intended applications. Such compositions should be able to be packaged in sealed containers or cartridges and stored for relatively long periods of time without objectionably "setting up" or hardening (as a result of cross-linking). When applied as a caulking sealant or coating composition, they should form a relatively tack-free surface soon after being applied and exposed to atmospheric moisture, and should cure without the formation of bubbles within an acceptable time period. Such compositions should adhere tenaciously in the cured state to a wide variety of surfaces, such as to glass, aluminum, concrete, marble and steel surfaces. The sealant or coating in the cured state should have sufficient elasticity and flexibility to withstand expansions and contractions of panels, etc. with which it is associated during temperature variations that result from climatic changes, and to withstand wind forces that cause panels with which it is associated to flex or twist.

Polyurethane sealant and coating compositions typically are based on isocyanate-terminated prepolymers. In some cases, such prepolymers are fully or partially end-capped with silane groups. In general, sealants made with prepolymers that have been 100% end-capped with silane groups are not sufficiently flexible to sustain large joint movement. Accordingly, prepolymers that are end capped with a combination of silane groups and other groups, particularly aliphatic alcohol groups, have been developed. Although sealants made with prepolymers that have been end capped with a combination of silane and aliphatic alcohol groups have enhanced flexibility, these sealants are more likely to chalk, crack and yellow when exposed to extreme weathering conditions of high heat, high moisture, and prolonged exposure to UV radiation. Such sealants can also lose strength when exposed to these weathering conditions. Many of these undesirable changes can be attributed to reversion or degradation of the polymeric chains that are present in the cured sealant.

The polymeric chains of polurethane prepolyers that have been partially end-capped with aliphatic alcohol end cappers can degrade during storage, particularly when exposed to high heat. As a result of such degradation sealant compositions made with these prepolymers lose their mechanical strength and are, thus, less desirable.

Accordingly, it is desirable to have new sealant compositions that provide elastomeric seals with improved weathering stability. New prepolymer compositions that have enhanced heat and storage stability are also desirable.

SUMMARY OF THE INVENTION

The present invention provides a prepolymer composition for preparing a one-part, moisture-curable sealant, adhesive or coating, and a method of making such prepolymer composition.

The prepolymer composition comprises a polyurethane prepolymer that is end-capped with silane groups or a combination of silane groups and end capping groups that have been derived from an alcohol and an amount, referred to hereinafter as an "excess", of aromatic alcohol. Preferably, the aromatic alcohol has a molecular weight of less than 2000. The silane end-capped prepolymer is formed by reacting a hydroxy-terminated polymeric material with an aromatic or, preferably, an aliphatic isocyanate to provide a prepolymer having terminal NCO groups, referred to hereinafter as the "original" NCO groups. The resulting polyurethane prepolymer is then partially or fully blocked or end-capped by reacting the prepolymer with a sufficient amount of a silane end capper to provide a polyurethane prepolymer in which 50% to 100% of the original NCO groups are capped with silane groups.

In those cases where the prepolymer is 100% end capped with silane groups, the prepolymer is then combined with a sufficient amount of the aromatic alcohol to provide a composition comprising an excess of unreacted aromatic alcohol and the prepolymer. In those cases where the prepolymer is partially end-capped with silane groups, the prepolymer may be reacted with aromatic alcohol to provide a composition comprising an excess of aromatic alcohol and a prepolymer that is fully end-capped with a combination of silane groups and aromatic alcohol groups. Alternatively, the prepolymer that is partially end-capped with silane groups may be reacted with an aliphatic alcohol in the presence of an aromatic alcohol to provide a composition comprising an excess of aromatic alcohol and a prepolymer that is end-capped with a combination of silane groups, aliphatic alcohol and aromatic alcohol groups. Alternatively, the prepolymer that is partially end-capped with silane groups may be reacted with an aliphatic alcohol in the absence of an aromatic alcohol to provide a prepolymer that is end-capped with a combination of silane groups, and aliphatic alcohol groups, and then combined with an aromatic alcohol to provide a composition comprising an excess of aromatic alcohol and the end-capped polyurethante prepolymer.

Depending upon the percentage of NCO groups that are end capped with silane groups, the level of aromatic alcohol that is combined with the silane-capped, polyurethane prepolymer is from greater than 0% to about 65% by mole of the level of the original NCO groups in the prepolymer. Thus, since the aromatic alcohol will react with NCO groups that are not end capped with silane groups to provide a polyurethane prepolymer that is end-capped with both silane groups and aromatic alcohol groups, the excess of aromatic alcohol in the composition is from greater than 0% to 15% by mole of the level of original NCO groups in the prepolymer.

The present invention also provides sealant compositions and coating compositions that are made with the present prepolymer composition. The sealant composition and coating composition comprise the present prepolymer composition, and a catalyst for increasing the cure rate of the sealant composition or the coating composition. Preferably, the sealant composition further comprises a reinforcing filler.

Optionally, the sealant composition comprises one or more of an adhesion promoter, a rheology modifier, a moisture scavenger and a UV stabilizer.

The present prepolymer composition, sealant composition, and coating composition have improved weathering stability, heat stability and UV stability as compared to compositions that do not contain excess aromatic alcohol. The sealants that are formed by moisture curing the present sealant composition have excellent mechanical properties, such as high elongation, low modulus, and excellent adhesion. Because they are solvent free, the prepolymer and sealant compositions of the present invention are also environmentally friendly.

DETAILED DESCRIPTION OF THE INVENTION

The present invention relates to prepolymer compositions and to sealant compositions and coating compositions comprising the present prepolymer compositions.

Prepolymer Composition

In one aspect, the present invention provides prepolymer compositions with improved storage capabilities. Such prepolymer compositions comprise an amount of unreacted aromatic alcohol, referred to herein as an excess, and a polyurethane prepolymer whose terminal ends are fully end-capped either with silane groups or with a combination of silane groups and end capping groups that have been derived from one or more aromatic alcohols, or one or more aliphatic alcohols, or a combination of one more aromatic alchohols and one or more aliphatic alcohols. The prepolymer is made by reacting a hydroxy-terminated polymeric material with an isocyanate to provide a prepolymer chain having NCO groups at the ends thereof. The resulting polyurethane prepolymer is then reacted with a sufficient amount of a silane end-capper to provide a polyurethane prepolymer in which from 50 to 100%, preferably from 70 to 100%, more preferably from 85 to 100% of the NCO groups are blocked or end-capped with a silane group.

Suitable hydroxy-terminated polymeric materials for preparing the present silane end-capped, polyurethane prepolymer include, but are not limited to di, tri, and tetra functional polyols, including polyether polyols, polyester polyols, acrylic polyols, and polyols comprising two or more hydroxyl groups and a straight or branched chain hydrocarbon.

Suitable polyether diols and triols include polyethylene ether diols or triols, polypropylene ether diols or triols, polybutylene ether diols or triols, polytetramethylene ether diols or triols, and block copolymers of such diols and triols.

Suitable hydroxy-terminated polyesters include any hydroxy-terminated polyester prepared from poly-basic acids or anhydrides (for example, adipic acid and phthalic anhydride) and polyols in which the hydroxyl functionality of the polyester prepolymer is greater than 2, preferably over 2.3. Polylactone containing hydroxyl groups are also suitable for making the prepolymer, particularly polycaprolactone diol and triol.

Suitable acrylic polyols include hydroxyl-terminated polyacrylate. Acrylates include, but are not limited to, butylacrylate, methylacrylate, methylmethacrylate, ethyl acrylate, 2-ethylhexyl acrylate or the mixture of above. Suitable polyols comprising two or more hydroxyl groups and a straight or branched hydrocarbon chain include hydroxyl functionalized polybutadiene. Other suitable polyols include polycarbonates having hydroxyl groups.

Preferably the polyol has a weight average molecular weight of from 500 to 18,000. For prepolymers that are used to make sealant compositions, it is preferred that the polyol have a weight average molecular weight of from 2,000 to 8,000. For prepolymers that are used to make coating compositions, it is preferred that the polyol have a weight average weight average molecular weight of from 500 to 4000.

The isocyanates that are reacted with the hydroxy-terminated backbone polymer are organic isocyanates having 2 or more isocyanate groups or a mixture of such organic isocyanates. The isocyanates are aromatic or, preferably, aliphatic isocyanates. Examples of suitable aromatic di- or triisocyanates include p,p',p"-triisocyanato triphenyl methane, p,p'-diisocyanato diphenyl methane, naphthalene-1,5-diisocyanate, 2,4-tolylene diisocyanate, 2,6-tolylene diisocyanate, and mixtures thereof. Examples of preferred aliphatic isocyantes are isophorone diisocyanate, dicyclohexyl methane-4,4'-diisocyanate, and mixtures thereof.

The polyurethane prepolymer may be prepared by mixing the hydroxy-terminated polymer and organic isocyanate together at ambient temperature and pressure, although the speed of the reaction is significantly increased if the temperature of the reaction mixture is raised to a higher temperature, for example, a temperature between 60–100° C. A stoichiometric excess of the isocyanate is used to ensure that the polyurethane prepolymer has NCO terminal groups.

The resulting prepolymer having terminal NCO groups is then reacted with silane capping agents so that from 50 to 100%, preferably from 70 to 100%, more preferably from 85 to 100% by mole of the original terminal NCO groups are blocked or end-capped with silane groups. Examples of suitable silane capping agents include, but are not limited to, silanes corresponding to the formula I.

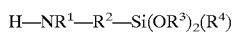

H—NR$^1$—R$^2$—Si(OR$^3$)$_2$(R$^4$)     I wherein R$^1$ represents hydrogen, a substituted aliphatic, cycloaliphatic, and/or aromatic hydrocarbon radical containing 1 to 10 carbon atoms, a second —R$^2$—Si (OR$^3$)$_2$(R$^4$), or —CHR$^5$—CHR$^6$COOR$^7$ where R$^5$ and R$^6$ are H or C$_{1-6}$ organic moiety, and R$^7$ is C$_{1-10}$ organic moiety.

R$^2$ represents a linear or branched alkylene radical containing 1 to 8 carbon atoms.

R$^3$ represents a C$_{1-6}$ alkyl group.

R$^4$=—CH$_3$, —CH$_2$CH$_3$, or OR$^3$.

Examples of suitable aminosilanes corresponding to formula I include N-phenylaminopropyltrimethoxysilane, N-ethylaminoisobutyltrimethoxysilane, gamma-aminopropyltrimethoxysilane, gamma-aminopropyltriethoxysilane, and the reaction product of an aminosilane (such as gamma-aminopropyltrimethoxysilane, gamma-aminopropyltriethoxysilane, gamma-aminopropylmethyldimethoxysilane) with an acrylaic monomer (such as ethyl acrylate, butyl acrylate, 2-ethylhexyl acrylate, methyl acrylate, methyl methacrylate, and glycidal acrylate).

Examples of other suitable silanes include mercaptosilane, the reaction product of a mercaptosilane with a monoepoxide, and the reaction product of an epoxysilane with a secondary amine.

Methods of preparing polyurethane prepolymers, and silylated polyurethane prepolymers are well known in the art. See, e.g., U.S. Pat. Nos. 3,627,722, 3,632,557, 3,979, 344, and 4,222,925, which are incorporated herein by reference.

The resulting silylated, polyurethane prepolymers are then combined with a sufficient amount of an alcohol to block or end-cap any unreacted, i.e., non-silylated, NCO groups. The alcohol can be an aliphatic alcohol, or, preferably, an aromatic alcohol, or a combination of one or more aromatic alcohols and one or more aliphatic alcohols. The fully-blocked polyurethane prepolymer, i.e., the prepolymer whose NCO groups are 100% blocked with either silane groups or a combination of silane groups and alcohol groups is combined with a sufficient amount of an aromatic alcohol to provide a prepolymer composition comprising an end-capped polyurethane prepolymer and unreacted aromatic alcohol. Optionally, the composition may also comprise a small amount, i.e., less than 5% by mole of original NCO groups of unreacted aliphatic alcohol. Depending upon the level of unreacted NCO groups, the silylated prepolymer is reacted with a level of alcohol, preferably an aromatic alcohol, which is greater than 0% to 65% by mole of the original NCO groups in the polyurethane prepolymer. Thus, the amount of unreacted or excess aromatic alcohol in the resulting composition is from greater than 0% to 15% by mole of the original NCO groups in the polyurethane prepolymer. Preferably, the amount of unreacted or excess aromatic alcohol in the resulting composition is greater than 2% by mole of the original NCO groups in the polyurethane prepolymer.

Preferably, the aromatic alcohol has a molecular weight less than 2000. Examples of suitable aromatic alcohols include phenol, 3-methoxyphenol, 4-methoxyphenol, nonylphenol, meta-cresol, para-cresol, 4-chlorophenol, meta-hydroxybenzaldehyde, ortho-hydroxybenzaldehyde, para-hydroxybenzaldehyde, hydroquinone, 1-hydroxy-2-propanone, 3-hydroxyacetophenone, and 4-hydroxyacetophenone.

The polyurethane prepolymer that is partially end-capped with silane groups is reacted with the aromatic alcohol at 80° C. for 90 minutes to provide a composition comprising a silane and aromatic alcohol end capped, polyurethane prepolymer and an excess of aromatic alcohol. Alternatively, the polyurethane prepolymer that is partially end-capped with silane groups is reacted with an aliphatic alcohol or a combination of an aliphatic and an aromatic alcohol at 80° C. for 90 minutes to provide a composition comprising an polyurethane composition that is fully end-capped with a combination of silane groups and alcohol groups. In those instances where the prepolymer is 100% end-capped with silane groups or a combination of silane groups and alcohol end capping groups, the polymer may be combined with the excess of aromatic alcohol without heating.

Optionally, the composition also comprises a moisture scavenger which may be added after the reaction. Examples of moisture scavengers for inclusion in the prepolymer composition are vinyltrimethoxysilane, methyltrimethoxysilane, hexamethyldisilazane, paratoluene sulfonyl isocyanate (PTSI), toluene diisocyanate (TDI), diphenyl methane diisocyanate (MDI), and polymeric MDI. The moisture content of the prepolymer preferably is 0.1 to 10%, more preferably 0.2 to 3%.

Sealant and Coating Compositions

In another aspect, the present invention provides a sealant composition or coating composition which comprises the present prepolymer composition and a curing catalyst. Suitable curing catalysts include dibutyltin diacetate, dibutyltin dilaurate, and dibutyltin bis(acetylacetonate).

Preferably, the sealant composition or coating composition comprises a reinforcing filler. Examples of suitable reinforcing fillers include, but are not limited to, $CaCO_3$, fume silica, clay, talc. Preferably, the sealant composition also comprises an adhesion promoter. Suitable adhesion promoters include, but are not limited to, aminosilane and epoxysilane. Optionally, the sealant composition comprises one or more of, a rheology modifier, a moisture scavenger and a UV stabilizer. Examples of suitable moisture scavengers in sealant composition are, toluene diisocyanate (TDI), diphenyl methane diisocyanate (MDI), and polymeric MDI, vinyltrimethoxysilane, methyltrimethoxysilane, hexamethyldisilazane, paratoluene sulfonyl isocyanate The compositions are prepared by mixing the prepolymer composition with the reinforcing filler until a homogenous mixture is achieved. The mixing is conducted under conditions which reduce the levels of moisture in the mixture. Thereafter, the catalyst and other desirable components, e.g., an adhesion promoter, are added to the mixture.

Application of the Sealant and Coating Compositions

The sealant composition may be used to seal or bond buildings, highways, bridges, trucks, trailers, buses, recreational vehicles, cars, utilities, window applications, etc. Dissimilar materials that may, for example, be sealed or bonded with the present sealant composition include cement containing products, metals, plastics, glass, EIFS materials, vinyls, painted metals, coated glasses, Kynar, marble, granite, and brick. The sealant composition may be applied using standard equipment, such as a caulking gun or pump.

The coating composition may be applied to a surface by spraying or poured onto the surface and spread across the surface with a roller or other similar device.

EXAMPLES

The following examples are for purposes of illustration only and are not intended to limit the scope of the invention as defined in the claims which are appended hereto.

Example 1

Prepolymer Composition 782 gram of polypropylene glycol diol having an average weight average molecular weight of 4000, 118 gram of diisodecyl phthalate (DIDP) and 51 gram of toluene diisocyanate (TDI) were reacted with stirring under nitrogen with 0.04 gram of dibutyltindilaurate at a temperature of 75 to 80° C. After the theoretical NCO content of about 0.7% was reached, 43 gram of an aminosilane (a reaction product of aminopropyltrimethoxysilane and an ethyl acrylate) was added to the reactor. The reaction continues until the free NCO content is below 0.05%. 3 gram of nonylphenol was then added to the reaction mixture along with 0.02 gram of dibutyltin dilaurate. Reaction continues at 75° C. until % of NCO drops to zero. 3.3 gram of vinyltrimethoxysilane (a moisture scavenger) was added at the end of reaction. The resulting prepolymer composition had a Brookfield viscosity of about 30,000 cps art 25° C. The Brookfield viscosity of the prepolymer composition is below 40,000 cps after one year shelf aging.

Example 2

Prepolymer Composition 868 gram of polypropylene glycol diol having an average weight average molecular weight of 4000 and 74.4 gram of isophorone diisocyanate were reacted under nitrogen with 0.06 gram of dibutyltindilaurate at a temperature of 85° C. After the theoretical NCO content of about 0.85% was reached, 43 gram of an aminosilane (a reaction product of aminopropyltrimethoxysilane and an ethyl acrylate) was added to the reactor. The reaction continues until the free NCO content is below 0.2%. 11 gram of nonylphenol was then added to the reaction mixture. Reaction continues at 85° C. until % of NCO drops to zero. 4 gram of vinyltrimethoxysilane (a moisture scavenger) was added at the end of reaction. The resulting prepolymer compositon had a Brookfield viscosity of about 32,000 cps at 25° C. The Brookfield viscosity of the prepolymer composition is below 40,000 cps after one year shelf aging.

Example 3

Prepolymer Composition 876 gram of polypropylene glycol diol having an average weight average molecular weight of 4000 and 75.4 gram of isophorone diisocyanate were reacted under nitrogen with 0.06 gram of dibutyltindilaurate at a temperature of 85° C. After the theoretical NCO content of about 0.85% was reached, 34 gram of N-ethylaminoisobutyltrimethoxysilane was added to the reactor. The reaction continues until the free NCO content is below 0.2%. 11 gram of nonylphenol was then added to the reaction mixture. Reaction continues at 85° C. until % of NCO drops to zero. 4 gram of vinyltrimethoxysilane (a moisture scavenger) was added at the end of reaction. The resulting prepolymer composition has a Brookfield viscosity of about 38,000 cps art 25° C. The Brookfield viscosity of the prepolymer compostion is below 45,000 cps after one year shelf aging.

Example 4

Sealant Compositions

Sealant compositions were produced based on the following formulation.

| Materials | % by weight |
| --- | --- |
| Silane and nonylphenol endcapped Polyurethane prepolymers (Example 1, 2, or 3) | 27.04 |
| Plasticizer (Santicizer 160) | 17 |
| Coated precipitated calcium carbonate (Hakuenka CCR) | 40 |
| Coated ground calcium carbonate (Hi-Pflex 100) | 10 |
| Colorant | 4.3 |
| Vinyltrimethoxysilane (A-171) | 1 |
| Aminopropyltrimothoxysilane | 0.08 |
| N-ethylaminopropylisobytultrimethoxysilane | 0.5 |
| Dibutyltindiacetate | 0.08 |

The sealant compositions were prepared first by mixing the polyurethane prepolymer composition of Example 1, 2, or 3 with plasticizer, calcium carbonate and colorant at 75° C. under vacuum for about 60 minutes to reduce the level of moisture in the system. All silanes and catalyst were then charged to the mixture, and mixing under vacuum continued for 10 minutes.

Each of the three sealant compositions prepared as described exhibited excellent stability upon being stored in sealed container at ambient condition for more than one year. Cured sealant developed a Shore A hardness of 20 after being exposed for three weeks at 50% humidity and 25° C. No cracks or chalks or any other indicators of reversion, i.e., degradation of the polymeric bonds, were observed in the sealant upon being exposed to UV light in Xenon Wertherometer for more than 4000 hours. Shore A hardness was still maintained at about 20 after 4000 hours exposure to UV light. In addition, sealant made with prepolymers of examples 2 and 3 gave excellent color stability after UV light exposure.

All sealants also provided excellent physical properties. Skin formation time for all sealants is about 60 minutes. The extrusion rate of the sealant is about 20 second for 20 gram of material at 60 psi. Tensile strength at break was about 150 psi, elongation at break was more than 500%, tear strength was about 40 pli. All sealants also gave excellent adhesion to various substrates, such as aluminum, glass, concrete, vinyl, steel, and brick.

Thus, the sealant or coating compositions of the present invention have excellent shelf-life, have excellent flowability for easy gunning, have good flexibility to withstand joint movement, do not shrink and gas upon curing, have excellent weathering stability upon exposure to UV light, and give fast skin time after exposed to the atmosphere moisture.

What is claimed is:

1. A prepolymer composition for preparing sealant and coating compositions, comprising:
   a) prepolymers comprising terminal NCO groups that are end-capped with silane groups or with silane groups and alcohol groups, and
   b) an excess of unreacted aromatic alcohol selected from phenol, 3-methoxyphenol, 4-methoxyphenol, nonylphenol, meta-cresol, para-cresol, 4-chlorophenol, meta-hydroxybenzaldehyde, ortho-hydroxybenzaldehyde, para-hydroxybenzaldehyde, hydroquinone, 3-hydroxyacetophenone, and 4-hydroxyacetophenone, or any combination thereof.

2. The prepolymer composition of claim 1 wherein the prepolymers comprise terminal NCO groups that are end-capped with silane groups and alcohol groups.

3. The prepolymer composition of claim 1 wherein the excess of unreacted aromatic alcohol in the composition is from greater than 0% to 15% by mole of the end-capped NCO groups in the prepolymer.

4. The prepolymer composition of claim 3 wherein the excess of unreacted aromatic alcohol in the composition is greater than 2% by mole of the end-capped NCO groups in the prepoloymer.

5. The prepolymer composition of claim 1, wherein the composition further comprises an excess of unreacted aliphatic alcohol, wherein the excess of unreacted aliphatic alcohol in the composition is less than the excess of aromatic alcohol in the composition, and
   wherein the excess of unreacted aliphatic alcohol in the composition is less than 5% by mole of the end-capped NCO groups in the prepolymer.

6. The prepolymer composition of claim 1 wherein from 50% to 100% of the NCO groups are end-capped with silane end-capping groups and wherein from 0% to 50% of the NCO groups on the prepolymer are end-capped with aromatic alcohol end-capping groups, or aliphatic alcohol end-capping groups, or a combination of aromatic and aliphatic alcohol end-capping groups.

7. The prepolymer composition of claim 1 wherein from 70% to 100% of the NCO groups on the prepolymer are end-capped with silane end-capping groups and wherein from 0% to 30% of the NCO groups on the prepolymer are end-capped with aromatic alcohol end-capping groups, or aliphatic alcohol end-capping groups, or a combination of aromatic and aliphatic alcohol end-capping groups.

8. The prepolymer composition of claim 1 wherein from 80% to 100% of the NCO groups on the prepolymer are end-capped with silane end-capping groups and wherein from 0% to 20% of the NCO groups on the prepolymer are end-capped with aromatic alcohol end-capping groups, or aliphatic alcohol end-capping groups, or a combination of aromatic and aliphatic alcohol end-capping groups.

9. The prepolymer composition of claim 1, wherein said composition further comprises a moisture scavenger.

10. The prepolymer composition of claim 9 wherein the moisture scavenger is selected from the group consisting of vinytrimethoxysilane, methyltrimethoxysilane, hexamethyldisilazane, paratoluene sulfonyl isocyanate (PTSI), toluene diisocyanate (TDI), diphenyl methane diisocyanate (MDI), and polymeric MDI.

11. A prepolymer composition for preparing sealant and coating compositions, comprising:
   a) prepolymers comprising terminal NCO groups that are end-capped with a combination of silane groups and aromatic alcohol groups, and
   b) an excess of an aromatic alcohol having a weight average molecular weight of less than 2000,
   wherein from 50% to or more of the NCO groups on the prepolymers are end-capped with silane end-capping groups and wherein from 50% or less of the NCO groups on the prepolymers are end-capped with aromatic alcohol end-capping groups, and
   wherein the excess aromatic alcohol in the composition is from greater than 0% to 15%
   by mole of the end-capped NCO groups in the prepolymer.

12. A method of preparing a prepolymer composition;
   a) reacting a hydroxyterminated polymer with an organic isocyanate have 2 or more isocyanate groups to provide a prepolymer comprising terminal NCO groups;
   b) reacting the prepolymers of step (a) with silane capping agent to provide a prepolymer in which from 50% to 100% of the NCO groups on the prepolymer are end capped with a silane group;
   c) optionally reacting the partially silane end-capped prepolymer of step (b) with an aromatic alcohol, an aliphatic alcohol, or a combination of an aromatic alcohol and an aliphatic alcohol to provide a polyurethane prepolymer that is partially end-capped with silane groups and partially end capped with alcohol groups,
   d) reacting the prepolymer of step (b) or step (c) with a sufficient amount of an aromatic alcohol selected from phenol, 3-methoxyphenol, 4-methoxyphenol, nonylphenol, meta-cresol, para-cresol, 4-chlorophenol, meta-hydroxybenzaldehyde, ortho-hydroxybenzaldehyde, para-hydroxybenzaldehyde, hydroquinone, 3-hydroxyacetophenone, and 4-hydroxyacetophenone, or any combination thereof to provide a prepolymer composition comprising a fully end-capped NCO groups and an excess of aromatic alcohol.

13. The method of claim 12 wherein step d comprises reacting the prepolymer that is partially or fully end capped with silane group with a level of alcohol, said level being from greater than 0% to 65% by mole of the level of original NCO groups in the prepolymer.

14. The method of claim 12 wherein the silane capping agent has the following formula:

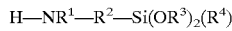

$$H-NR^1-R^2-Si(OR^3)_2(R^4) \qquad I$$

wherein $R^1$ represents hydrogen, a substituted aliphatic, cycloaliphatic, and/or aromatic hydrocarbon radical containing 1 to 10 carbon atoms, a second $-R^2-Si(OR^3)_2(R^4)$, or $-CHR^5-CHR^6COOR^7$ where $R^5$ and $R^6$ are H or $C_{1-6}$ organic moiety, and $R^7$ is $C_{1-10}$ organic moiety, $R^2$ represents a linear or branched alkylene radical containing 1 to 8 carbon atoms, $R^3$ represents a $C_{1-6}$ alkyl group, and $R^4 = -CH_3$, $-CH_2CH_3$, or $OR^3$.

15. The method of claim 12 wherein the silane capping agent is selected from the group consisting of N-phenylaminopropyltrimethoxysilane, N-ethylaminoisobutyltrimethoxysilane, gamma-aminopropyltrimethoxysilane, gamma-aminopropyltriethoxysilane, the reaction product of an aminosilane with an acrylaic monomer, mercaptosilane, the reaction product of a mercaptosilane with a monoepoxide, and the reaction product of an epoxysilane with a secondary amine.

16. The method of claim 12 wherein the hydroxy-terminated polymer has a weight average molecular weight of from 500 to 18000.

17. The method of claim 12 wherein the aromatic alcohol has a molecular weight of less than 2000.

18. The method of claim 12 wherein the amount of aromatic alcohol that is reacted with the silane end-capped prepolymer is from greater than 0% to 65% by mole of the original NCO groups in the prepolymer.

19. The method of claim 8 wherein from 85% to 100% of the NCO groups in the prepolymer are end-capped with silane groups, and
   wherein the amount of aromatic alcohol that is reacted with the silane end-capped polyurethane prepolymer is from greater than 0% to 30% by mole of the original NCO groups in the prepolymer.

20. The method of claim 12 wherein the hydroxy-terminated polymer is reacted with an aliphatic isocyante.

21. The method of claim 20 wherein the aliphatic isocyanate is isophorone diisocyanate or dicyclohexyl methane-4,4'-diisocyanate, or a mixture of isophorone diisocyanate and dicyclohexyl methane-4,4'-diisocyanate.

22. The method of claim 12 wherein the hydroxy-terminated polymer is selected from the group consisting of a polyether polyol, a polyester polyol, an acrylic polyol, and a hydrocarbon chain comprising 2 or more hydroxyl groups.

23. A sealant composition comprising:
   a) a prepolymer composition comprising:
      i) prepolymers comprising terminal NCO groups that are end-capped with silane groups or a combination of silane groups and alcohol-derived end capping groups, wherein said prepolymers have a weight average molecular weight of from 5,000 to 60,000, and
      ii) an excess of an unreacted aromatic alcohol selected from phenol, 3-methoxyphenol, 4-methoxyphenol, nonylphenol, meta-cresol, para-cresol, 4-chlorophenol, meta-hydroxybenzaldehyde, ortho-hydroxybenzaldehyde, para-hydroxybenzaldehyde, hydroquinone, 3-hydroxyacetophenone, and 4-hydroxyacetophenone, and
   b) a catalyst for promoting cross-linking between the prepolymers when the sealant composition is exposed to atmospheric moisture.

24. The sealant composition of claim 23 wherein the excess of unreacted aromatic alcohol in the composition is from greater than 0% to 15% by mole of the end-capped NCO groups in the prepolymer.

25. The sealant composition of claim 23 wherein from 50% to 100% of the NCO groups on the prepolymer are end-capped with silane end-capping groups and wherein from 0% to 50% of the NCO groups on the prepolymer are end-capped with aromatic alcohol end-capping groups, or aliphatic alcohol end-capping groups, or a combination of aromatic and aliphatic alcohol end-capping groups.

26. The sealant composition of claim 23 wherein from 70% to 100% of the NCO groups on the prepolymer are end-capped with silane end-capping groups and wherein from 0% to 30% of the NCO groups on the prepolymer are end-capped with with aromatic alcohol end-capping groups, or aliphatic alcohol end-capping groups, or a combination of aromatic and aliphatic alcohol end-capping groups.

27. The sealant composition of claim 23 wherein from 80% to 100% of the NCO groups on the prepolymer are end-capped with silane end-capping groups and wherein from 0% to 20% of the NCO groups on the prepolymer are end-capped with aromatic alcohol end-capping groups, or aliphatic alcohol end-capping groups, or a combination of aromatic and aliphatic alcohol end-capping groups.

28. The sealant composition of claim 23 further comprising a reinforcing filler.

29. The sealant composition of claim 23 further comprising a moisture scavenger.

30. The sealant composition of claim 23 further comprising an adhesion promoter.

31. A coating composition comprising:
  a) a prepolymer composition comprising:
    i) prepolymers comprising terminal NCO groups that are end-capped with silane groups or a combination of silane groups and alcohol-derived end capping groups, wherein said prepolymers have a weight average molecular weight of from 1,000 to 20,000, and
    ii) an excess of an aromatic alcohol selected from phenol, 3-methoxyphenol, 4-methoxyphenol, nonylphenol, meta-cresol, para-cresol, 4-chlorophenol, meta-hydroxybenzaldehyde, ortho-hydroxybenzaldehyde, para-hydroxybenzaldehyde, hydroquinone, 3-hydroxyacetophenone, and 4-hydroxyacetophenone, or any combination thereof, and
  b) a catalyst for promoting cross-linking between the prepolymers when the coating composition is exposed to atmospheric moisture.

32. The prepolymer composition of claim 11, wherein the aromatic alcohol is selected from phenol, 3-methoxyphenol, 4-methoxyphenol, nonylphenol, meta-cresol, para-cresol, 4-chlorophenol, meta-hydroxybenzaldehyde, ortho-hydroxybenzaldehyde, para-hydroxybenzaldehyde, hydroquinone, 3-hydroxyacetophenone, and 4-hydroxyacetophenone, or any combination thereof.

33. The sealant composition of claim 23, wherein the prepolymer composition comprises prepolymers that comprise terminal NCO groups that are end-capped with silane groups and alcohol groups.

34. The coating composition of claim 31, wherein the prepolymer composition comprises prepolymers that comprise terminal NCO groups that are end-capped with silane groups and alcohol groups.

* * * * *

UNITED STATES PATENT AND TRADEMARK OFFICE
CERTIFICATE OF CORRECTION

PATENT NO. : 6,989,429 B2 Page 1 of 1
DATED : January 24, 2006
INVENTOR(S) : Ta-Min Feng It is certified that error appears in the above-identified patent and that said Letters Patent is hereby corrected as shown below:

<u>Column 9,</u>
Line 23, after "50%" delete "to".
Line 55, after "comprising" delete "a".

Signed and Sealed this

Twenty-eighth Day of March, 2006

JON W. DUDAS
*Director of the United States Patent and Trademark Office*